(12) United States Patent  (10) Patent No.: US 9,002,532 B2
Asmus  (45) Date of Patent: Apr. 7, 2015

(54) SYSTEMS AND METHODS FOR CONTROLLING A CHILLER PLANT FOR A BUILDING

(75) Inventor: Matthew J. Asmus, Watertown, WI (US)

(73) Assignee: Johnson Controls Technology Company, Holland, MI (US)

( * ) Notice: Subject to any disclaimer, the term of this patent is extended or adjusted under 35 U.S.C. 154(b) by 431 days.

(21) Appl. No.: 13/533,848

(22) Filed: Jun. 26, 2012

(65) Prior Publication Data
US 2013/0345880 A1 Dec. 26, 2013

(51) Int. Cl.
G05D 23/00 (2006.01)
G05D 23/19 (2006.01)
G01M 1/38 (2006.01)
G05B 13/00 (2006.01)
G05B 15/00 (2006.01)
G05B 13/02 (2006.01)

(52) U.S. Cl.
CPC .................................. *G05D 23/1917* (2013.01)

(58) Field of Classification Search
CPC .................................................. G05D 23/1917
USPC ...................... 700/28–32, 276–278, 291, 297, 700/299–300; 236/1 B, 1 C, 91 R
See application file for complete search history.

(56) References Cited

U.S. PATENT DOCUMENTS

| | | | |
|---|---|---|---|
| 5,083,438 A | 1/1992 | McMullin | |
| 5,193,742 A | 3/1993 | Byun | |
| 5,540,555 A | 7/1996 | Corso et al. | |
| 5,573,181 A | 11/1996 | Ahmed | |
| 5,579,993 A | 12/1996 | Ahmed et al. | |
| 5,600,960 A | 2/1997 | Schwedler et al. | |
| 5,669,225 A | 9/1997 | Beaverson et al. | |
| 5,809,795 A | 9/1998 | Beaverson et al. | |
| 5,902,183 A | 5/1999 | D'Souza | |
| 6,085,532 A | 7/2000 | Sibik | |
| 6,095,426 A | 8/2000 | Ahmed et al. | |
| RE37,245 E | 6/2001 | Scholten et al. | |
| 6,257,007 B1 * | 7/2001 | Hartman | 62/183 |
| 6,276,152 B1 | 8/2001 | Sibik | |
| 6,505,475 B1 | 1/2003 | Zugibe et al. | |
| 6,532,754 B2 | 3/2003 | Haley et al. | |
| 6,688,384 B2 | 2/2004 | Eoga | |
| 6,694,759 B1 | 2/2004 | Bash et al. | |
| 6,698,219 B2 | 3/2004 | Sekhar et al. | |
| 6,718,779 B1 | 4/2004 | Henry | |
| 6,719,625 B2 | 4/2004 | Federspiel | |
| 6,726,111 B2 | 4/2004 | Weimer et al. | |
| 6,732,540 B2 | 5/2004 | Sugihara et al. | |
| 6,848,623 B2 | 2/2005 | Weimer et al. | |
| 6,879,881 B1 | 4/2005 | Attridge, Jr. | |

(Continued)

Primary Examiner — Ramesh Patel
(74) Attorney, Agent, or Firm — Foley & Lardner LLP

(57) ABSTRACT

A computerized method for controlling a chiller plant for cooling a building is provided. The chiller plant has a chiller plant load. The method includes estimating an optimal combination of chiller plant equipment for meeting the chiller plant load. Estimating the optimal combination of chiller plant equipment includes using binary optimization to determine at least two potential combinations of chiller plant equipment. Estimating the optimal combination of chiller plant equipment also includes using nonlinear optimization to determine a potential power consumption minimum for each of the at least two potential combinations. The method also includes controlling the chiller plant according to the estimated optimal combination of chiller plant equipment.

27 Claims, 9 Drawing Sheets

(56) References Cited

U.S. PATENT DOCUMENTS

| | | |
|---|---|---|
| 6,964,174 B2 | 11/2005 | Shah |
| 6,973,410 B2 | 12/2005 | Seigel |
| 7,017,827 B2 | 3/2006 | Shah et al. |
| 7,059,143 B1 | 6/2006 | Zugibe et al. |
| 7,086,240 B1 | 8/2006 | Zugibe et al. |
| 7,114,343 B2 | 10/2006 | Kates |
| 7,181,920 B2 | 2/2007 | Capellari et al. |
| 7,188,779 B2 | 3/2007 | Alles |
| 7,207,183 B2 | 4/2007 | Crane et al. |
| 7,231,773 B2 | 6/2007 | Crane et al. |
| 7,261,241 B2 | 8/2007 | Eoga |
| 7,275,377 B2 | 10/2007 | Kates |
| 7,293,718 B2 | 11/2007 | Sigafus et al. |
| 7,328,587 B2 | 2/2008 | Shaffer et al. |
| 7,341,201 B2 | 3/2008 | Stanimirovic |
| 7,347,774 B2 | 3/2008 | Aronstam et al. |
| 7,349,824 B2 | 3/2008 | Seigel |
| 7,421,854 B2 | 9/2008 | Shaffer et al. |
| 7,469,546 B2 | 12/2008 | Kates |
| 7,533,536 B1 | 5/2009 | Zugibe et al. |
| 7,551,983 B2 | 6/2009 | Attridge, Jr. |
| 7,567,888 B2 | 7/2009 | Chang et al. |
| 7,599,759 B2 | 10/2009 | Zugibe et al. |
| 7,650,206 B2 | 1/2010 | Hudson |
| 7,653,459 B2 | 1/2010 | Pouchak et al. |
| 7,661,274 B2 | 2/2010 | Crane et al. |
| 7,669,433 B2 | 3/2010 | Yoon et al. |
| 7,726,582 B2 | 6/2010 | Federspiel |
| 7,758,407 B2 | 7/2010 | Ahmed |
| 7,766,246 B2 | 8/2010 | Mulhouse et al. |
| 7,770,806 B2 | 8/2010 | Herzon et al. |
| 7,793,509 B2 | 9/2010 | Crane |
| 7,805,952 B1 | 10/2010 | Zugibe et al. |
| 7,819,331 B2 | 10/2010 | Arneson |
| 7,854,135 B2 | 12/2010 | Stanimirovic |
| 7,890,215 B2 | 2/2011 | Duncan |
| 7,891,573 B2 | 2/2011 | Finkam et al. |
| 7,894,943 B2 | 2/2011 | Sloup et al. |
| 7,918,407 B2 | 4/2011 | Patch |
| 7,945,423 B2 | 5/2011 | Seigel |
| 7,967,218 B2 | 6/2011 | Alles |
| 7,991,592 B2 * | 8/2011 | VanGilder et al. ............... 703/1 |
| 8,019,478 B2 | 9/2011 | Whitehurst et al. |
| 8,046,107 B2 | 10/2011 | Zugibe et al. |
| 8,078,330 B2 * | 12/2011 | Brickfield et al. ............ 700/291 |
| 8,473,080 B2 * | 6/2013 | Seem et al. ..................... 700/28 |
| 8,639,482 B2 * | 1/2014 | Rasmussen et al. ............. 703/5 |
| 2004/0159713 A1 | 8/2004 | Schmidt et al. |
| 2005/0082053 A1 | 4/2005 | Halabi |
| 2005/0234596 A1 | 10/2005 | Rietschel |
| 2006/0065752 A1 | 3/2006 | Poirier |
| 2006/0116067 A1 | 6/2006 | Federspiel |
| 2007/0028632 A1 | 2/2007 | Liu |
| 2007/0277542 A1 | 12/2007 | Rao |
| 2008/0051940 A1 | 2/2008 | Aronstam et al. |
| 2009/0255997 A1 | 10/2009 | Goldmann et al. |
| 2010/0006662 A1 | 1/2010 | Yonezawa et al. |
| 2010/0082162 A1 | 4/2010 | Mundy et al. |
| 2010/0094434 A1 | 4/2010 | Ballet et al. |
| 2010/0100246 A1 | 4/2010 | Josserand et al. |
| 2010/0161135 A1 | 6/2010 | Nerling |
| 2010/0211224 A1 | 8/2010 | Keeling et al. |
| 2010/0282857 A1 | 11/2010 | Steinberg |
| 2010/0298993 A1 | 11/2010 | Eaton et al. |
| 2011/0022193 A1 | 1/2011 | Panaitescu |
| 2011/0022236 A1 | 1/2011 | Higgins |
| 2011/0048046 A1 | 3/2011 | Sommer et al. |
| 2011/0066298 A1 * | 3/2011 | Francino et al. ............... 700/290 |
| 2011/0077758 A1 | 3/2011 | Tran et al. |
| 2011/0112695 A1 | 5/2011 | Ma et al. |
| 2011/0137468 A1 | 6/2011 | Duncan |
| 2011/0189938 A1 | 8/2011 | Yoshii et al. |
| 2011/0190946 A1 | 8/2011 | Wong et al. |
| 2011/0213502 A1 | 9/2011 | Uden |
| 2011/0218771 A1 | 9/2011 | Seigel |
| 2011/0230131 A1 | 9/2011 | Gao et al. |
| 2013/0073062 A1 * | 3/2013 | Smith et al. ..................... 700/33 |
| 2013/0085616 A1 * | 4/2013 | Wenzel ........................ 700/278 |
| 2014/0249680 A1 * | 9/2014 | Wenzel ........................ 700/276 |

\* cited by examiner

Chiller 1 | Chiller 2 | Chiller 3 | Chiller 4

Chiller 1 | Chiller 2 | Chiller 3 | Chiller 4

Chiller 1 | Chiller 2 | Chiller 3 | Chiller 4

Chiller 1 | Chiller 2 | Chiller 3 | Chiller 4

SYSTEMS AND METHODS FOR CONTROLLING A CHILLER PLANT FOR A BUILDING

BACKGROUND

The present disclosure generally relates to the operation of a chiller plant (e.g., multiple chillers, pumps, cooling towers, etc.) for cooling a building.

Buildings are often cooled using chilled water distributed through a building. Water conduits carrying the chilled water are routed to air handlers located on individual floors and sections of the building. The air handlers push air past cooling coils (or other heat exchanging structures) through which the chilled water flows. Heat is removed from the air by the cooling coils and the chilled water within the cooling coils. During this cycle, the chilled water warms up and is returned via water conduits to one or more chillers for cooling. This process continues, and the chillers can controllably adjust the temperature of the chilled water output for the air handlers. As variables such as temperature and humidity vary, multiple chillers, pumps, or cooling towers may need to be brought online or taken offline to serve the varying cooling needs of the building. Moreover, for example, running three chillers at 60% capacity may be more energy efficient than running one chiller near its maximum capacity to meet the same cooling demand. The chiller system accounts for a large use of electrical power in many buildings.

It is challenging and difficult to efficiently control a chiller plant for a building. Due in part to the varying nature of a building environment (e.g., occupancy, etc.), the varying nature of weather (e.g., temperature, humidity, etc.), and the varying nature of equipment performance, a chiller plant control setup for a first situation may be inappropriate or inefficient for a second situation.

SUMMARY

One embodiment of the invention relates to a computerized method for controlling a chiller plant for cooling a building. The chiller plant has a chiller plant load. The method includes estimating an optimal combination of chiller plant equipment for meeting the chiller plant load. Estimating the optimal combination of chiller plant equipment includes using binary optimization to determine at least two potential combinations of chiller plant equipment. Estimating the optimal combination of chiller plant equipment also includes using nonlinear optimization to determine a potential power consumption minimum for each of the at least two potential combinations. The method also includes controlling the chiller plant according to the estimated optimal combination of chiller plant equipment.

Another embodiment of the invention relates to a computerized method for controlling a chiller plant for cooling a building. The method includes identifying, at a processing circuit, a first combination of on/off statuses for a plurality of cooling devices using non-exhaustive binary optimization. The method also includes identifying at least a second combination of on/off statuses for the plurality of cooling devices. The method also includes identifying, for each of the first combination and at least a second combination, optimized operating setpoints for the plurality of cooling devices using a non-linear optimization. The method also includes, using the optimized operating setpoints identified with the non-linear optimization, estimating a likely energy consumption for the first combination of on/off statuses and at least a second combination of on/off statuses. The method also includes comparing the estimated likely energy consumption for the first combination of on/off statuses and at least a second combination of on/off statuses to determine which combination of cooling devices to turn on. The method also includes controlling the chiller plant according to the determined combination of cooling devices to turn on.

Yet another embodiment of the invention relates to a controller for controlling a chiller plant for cooling a building. The chiller plant has a chiller plant load. The controller includes a processing circuit configured to estimate an optimal combination of chiller plant equipment for meeting the chiller plant load. Estimating the optimal combination of chiller plant equipment includes using binary optimization to determine at least two potential combinations of chiller plant equipment. Estimating the optimal combination of chiller plant equipment also includes using nonlinear optimization to determine a potential power consumption minimum for each of the at least two potential combinations. The processing circuit is further configured to control the chiller plant according to the estimated optimal combination of chiller plant equipment.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DESCRIPTION

Figure 1A:
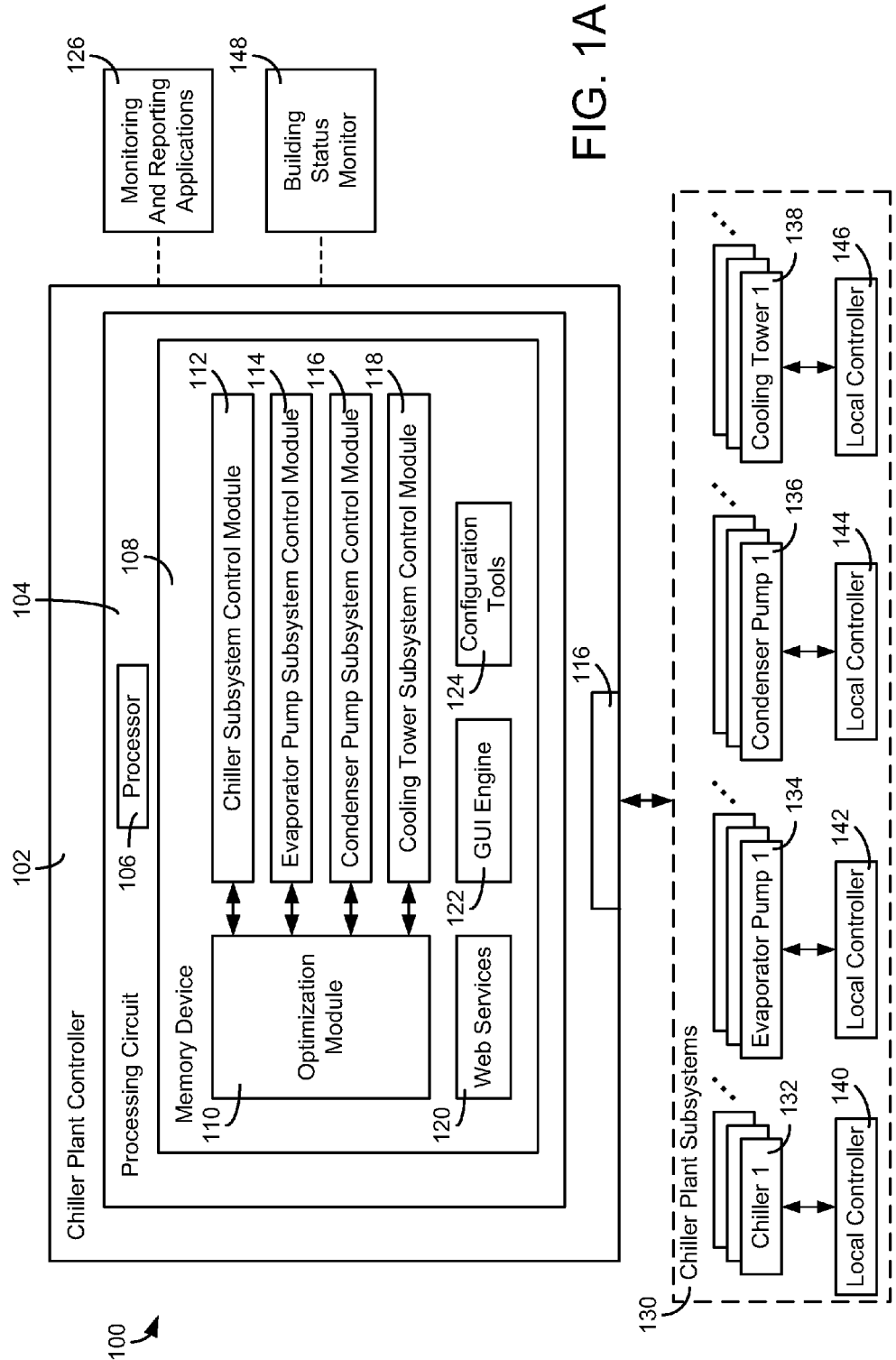
FIG. 1A is a block diagram of a chiller plant system, according to an exemplary embodiment.

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

A chilled water system or chiller plant may include multiple chillers, evaporator pumps, condenser pumps, and cooling towers. Depending on the cooling load requirements of a building, several of each type of equipment may be part of the chiller plant. For example, a chiller plant may include eight chillers, eight evaporator pumps, eight condenser pumps, and eight cooling towers. The chiller plant is generally configured to operate its equipment to meet the current cooling load (i.e., provide the cooling power necessary to maintain a building or building space at a desired temperature).

Many pieces of chiller plant equipment may be turned off or on to help contribute to providing cooling energy. Accordingly, the operating status of the equipment may correspond to a binary variable $x_i$, equal to 0 (off) or 1 (on). Thus, for example, for a chiller plant with forty total pieces of equipment that may be selectively turned on or off to adjust cooling performance, there are a total of $2^{40}$ on/off combinations. Each on/off combination may result in a different amount of energy consumption by the devices of the chiller plant. It should be noted that for some devices "off" may mean that some or all of the device's components are powered on but are not actively working to contribute cooling energy to the chiller plant. Off, for other types of devices, may also mean that the device is completely or nearly completely powered down.

In addition to being on or off, many pieces of equipment can operate at variable capacity or load levels. For example, a chiller may be commanded to operate at half capacity or 50% load rather than at 100% load. In fact, for many types of devices, it is not desirable (e.g., for efficiency reasons, for stability reasons, etc.) for the device to operate at 100% load. The individual devices of the chiller plant may also have one or more operating setpoints (e.g., valve position, vane position, fan speed, pump speed, etc.). The working capacity of one device may depend on the operating setpoints of other upstream, downstream, or component devices. For example, if the operating setpoints of other chiller plant equipment demand a greater amount of work to be done by a chiller, the chiller may operate at a higher capacity or load. The chilled water system as a whole may have one or more operating setpoints. These setpoints may, in turn, determine setpoints for the individual devices of the chilled water system. Energy consumption will depend on the particular setpoints. For example, a chilled water temperature setpoint, a condenser water temperature setpoint, and a chilled water return temperature setpoint may have different impacts on the energy usage of the chiller plant.

Heating and cooling systems may often expend approximately 40% of the energy usage in a building. Chilled water plants can account for 50% or more the heating/cooling system's energy usage. Selecting an optimal combination of equipment and selecting estimated optimal operating setpoints for the equipment may advantageously reduce energy consumption. At the same time, the equipment and setpoints should meet the chiller plant's cooling load (e.g., so that a comfortable environment can be provided within the building) and satisfy constraints (e.g., manufacturer recommended constraints) on the chilled water system and its components.

According to some embodiments of the present disclosure, the energy consumption of a chilled water plant is optimized with a mixed binary optimization and non-linear optimization. Non-exhaustive binary optimization and the non-linear optimization may both contribute to minimization of energy consumption. The binary optimization may be used to determine the optimal combination of equipment for meeting the plant load. The nonlinear optimization may be used to determine optimal operating setpoints (e.g., setpoints expected to result in minimum or near-minimum power consumption for a determined combination of equipment). A system or method of the present invention having mixed binary optimization and non-linear optimization may advantageously result in lower chiller plant operating costs. In some embodiments, the mixed optimization may be advantageously suited for improving real time (i.e., near real time) optimization and automation of a chilled water plant.

This description uses the terms such as optimized and minimum in a variety of contexts. It should generally be understood that optimized can mean estimated to be optimal, near-optimal, and/or approaching optimal and that devices which conduct the claimed structures or steps are intended to be covered by the scope of the claims even if the device does not exactly reach or find a true optimum. Similarly, minimum can mean estimated minimum, near-minimum, and/or approaching minimum and that devices which conduct the claimed structures or steps are intended to be covered by the scope of the claims even if the device does not exactly reach or find a true minimum.

Referring generally to the Figures, a computer system for use with a chiller plant is shown and described. The computer system is generally configured to automatically optimize power consumption of devices of the chiller plant. The computer system may be utilized in conjunction with other building management systems or as a part high level building management system. For example, the computer system for use with a chiller plant may be a part of a Johnson Controls METASYS Network Automation Engine.

The computer system includes a processing circuit configured to automatically identify combinations of devices in the chiller plant that should be turned on in order to meet the cooling load of a building or building space. The processing circuit is also configured to identify optimum operating setpoints for the devices. The processing circuit may be configured to communicate the identified on/off combinations and setpoints to at least one of a memory device, a user device, or another device on a building management system. This may alert a user to changes or automatically initiate adjustment to the operating status and/or setpoints of chiller plant devices. In some embodiments, the processes described herein may be used with sets of devices other than in a chilled water system.

Embodiments of the present disclosure are configured to automatically (e.g., via a computerized process) determine an optimal combination of on/off statuses for devices in a chiller plant that optimizes/minimizes energy consumption. The optimal combination may satisfy cooling load and system constraints while maintaining a minimum or near-minimum power consumption. The determination may occur by using non-exhaustive binary optimization (e.g., branch and bound) to minimize a cost function describing chiller plant power consumption. Binary optimization identifies and considers alternative or possible combinations of on/off statuses that can satisfy cooling load and system constraints. The determination may also involve quadratic compensation, which accounts for the quadratic power consumption of certain chiller plant devices. Quadratic compensation may be used in the consideration of alternate combinations of devices. The alternate combinations are compared to an identified combination, and the configuration with the lower power consumption may be applied to the chiller plant devices. Embodiments of the present disclosure are also configured to automatically determine optimum operating setpoints for the optimal combination of devices. The determination may occur by using non-linear optimization (e.g., Nelder-Mead/downhill simplex, Conjugate Gradient/Fletcher-Reeves Method, etc.). Automatically implementing the optimum operating setpoints may further optimize or reduce the power consumption of the optimum combination of devices.

Referring now to FIG. 1A, a block diagram of a chiller plant system 100 is shown, according to an exemplary embodiment. System 100 includes a chiller plant controller 102. Chiller plant controller 102 may be for controlling devices in a chiller plant and optimizing energy consumption and for completing other building functions. Chiller plant controller 102 may be configured to carry out process 300 (FIG. 3A), process 320 (FIG. 3B), process 350 (FIG. 3C), process 400 (FIG. 4), process 500 (FIG. 5), and other processes described herein and/or necessary to carry out the process described herein.

According to an exemplary embodiment, chiller plant controller 102 is integrated within a single computer (e.g., one server, one housing, etc.). In various other exemplary embodiments, the chiller plant controller 102 can be distributed across multiple servers or computers (e.g., that can exist in distributed locations). In another exemplary embodiment, chiller plant controller 102 may integrated with a smart building manager that manages the multiple building systems.

Chiller plant controller 102 is configured to include a communications interface 116. The communications interface 116 may be a network interface and the chiller plant controller 102 may be configured to communicate with the chiller plant subsystems 130 via a network connection provided by communications interface 116. Inputs from chiller plant subsystems 130 may be received at chiller plant controller 102, and chiller plant controller 102 may transmit operating parameters to chiller plant subsystems 130 via communications interface 116.

Chiller plant subsystems 130 are illustrated to include a plurality of chillers 132, evaporator pumps 134, condenser pumps 136, and cooling towers 138. In other embodiments, more, fewer, or different types of devices may be part of the chilled water system. Each device or collection of devices of the chilled water system may include a local controller 140.

According to an exemplary embodiment, chiller plant controller 102 may determine global operating conditions for the chiller plant. Local controllers 140 may select individual operating parameters for the devices, in response to global operating conditions determined by chiller plant controller 102 and received by the local controllers 140. For example, chiller plant controller 102 may determine an on/off configuration and global operating setpoints (e.g., chiller water temperature setpoint, etc.) for the chiller plant subsystems 103. In response to the on/off configuration and received global operating setpoints, local controllers 140 may turn the corresponding device on or off, and implement specific operating setpoints (e.g., damper position, vane position, fan speed, pump speed, etc.) to reach or maintain the global operating setpoints.

Chiller plant controller 102 may receive data regarding the overall building or building space to be cooled with the chilled water system via building status monitor 148. In an exemplary embodiment, building status monitor 148 may include a graphical user interface component configured to provide graphical user interfaces to a user for selecting building requirements (e.g., overall temperature parameters, selecting schedules for the building, selecting different temperature levels for different building zones, etc.). Chiller plant controller 102 may determine on/off configurations and operating setpoints to satisfy the building requirements received from building status monitor 148. In some embodiments, building status monitor 148 receives, collects, stores, and/or transmits cooling load requirements, building temperature setpoints, occupancy data, weather data, energy data, schedule data, and other building parameters. Building status monitor 148 may include data regarding energy costs, such as pricing information available from utilities (energy charge, demand charge, etc.).

Chiller plant controller 102 includes processing circuit 104. Processing circuit 104 includes a processor 106 and memory 108. Processor 106 can be implemented as a general purpose processor, an application specific integrated circuit (ASIC), one or more field programmable gate arrays (FPGAs), a group of processing components, or other suitable electronic processing components. Memory 108 is one or more devices (e.g., RAM, ROM, Flash memory, hard disk storage, etc.) for storing data and/or computer code for completing and/or facilitating the various processes and modules described in the present disclosure. Memory 108 may be or include volatile memory or non-volatile memory. Memory 108 may include database components, object code components, script components, or any other type of information structure for supporting the various activities and information structures described in the present disclosure. According to an exemplary embodiment, memory 108 is communicably connected to processor 106 via processing circuit 104 and includes computer code for executing (e.g., by processing circuit 104 and/or processor 106) one or more processes described herein.

Memory 108 includes optimization module 110. Optimization module 110 may receive inputs from and provide certain operating parameters to chiller plant subsystems 130. Optimization module 110 may determine optimum operating statuses (e.g., on or off) for a plurality of chiller plant devices. Optimization module 110 may store code executable by processor 106 to execute operations as subsequently described in this application, including binary optimization operations and/or quadratic compensation operations. According to an exemplary embodiment, the on/off combinations may be determined using binary optimization and quadratic compensation. Binary optimization may minimize a cost function representing the power consumption of devices in the chilled water system. In some embodiments, non-exhaustive (i.e., not all potential combinations of devices are considered) binary optimization is used. Quadratic compensation may be used in considering devices whose power consumption is quadratic (and not linear). Optimization module 110 may also determine optimum operating setpoints for the chilled water system using non-linear optimization. Non-linear optimization may identify operating setpoints that further minimize the power consumption cost function. Optimization module 110 is described in greater detail in the discussion of FIG. 1B.

Memory 108 further includes subsystem control modules for the chillers (112), evaporator pumps (114), condenser pumps (116), and cooling towers (118) of the chiller plant. Each of the system control modules may store historical data regarding past operating statuses, past operating setpoints, and instructions for calculating and/or implementing control parameters for the respective subsystem. Subsystem control modules 112, 114, 116, 118 may also receive, store, and/or transmit data regarding the conditions of the individual devices, such as operating efficiency, equipment degradation, a date since last service, a lifespan parameter, a condition grade, or other device-specific data. The subsystem control modules may receive data from chiller plant subsystems via communications interface 116. Subsystem control modules 112, 114, 116, 118 may also receive and store on/off statuses and operating setpoints from optimization module 110.

Data and processing results from modules 110, 112, 114, 116, 118, or other data stored or modules of chiller plant controller 102 may be accessed by or may be pushed to monitoring and reporting applications 126. This may allow real time "system health" dashboards to be viewed and navigated by a user (e.g., a chiller plant engineer). For example, monitoring and reporting applications 126 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across chiller plants in different buildings (real or modeled), different campuses, or the like. Other GUI elements or reports may be generated and shown based on available data that allow users to assess performance across one or more chillers plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of a chilled water system. Chiller plant controller 102 may include one or more GUI servers, services, or engine 122 (e.g., a web service) to support such applications. Further, in some embodiments, applications and GUI engines may be included outside of the chiller plant controller 102 (e.g., as part of a smart building manager). Chiller plant controller 102 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Chiller plant controller 102 may be configured to provide the results of any such processing to other databases, tables, XML files, or other data structures for further querying, calculation, or access by, for example, external monitoring and reporting applications.

Chiller plant controller 102 includes configuration tools 124. Configuration tools 124 can allow a user to define (e.g., via graphical user interfaces, via prompt-driven "wizards," etc.) how the chiller plant controller 102 should react to changing conditions in the chiller plant subsystems. In an exemplary embodiment, configuration tools 124 allow a user to build and store condition-response scenarios that can cross multiple chiller plant devices, multiple building systems, and multiple enterprise control applications (e.g., work order management system applications, entity resource planning applications, etc.). For example, the configuration tools 124 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudocode constructs or complex programming language functions (allowing for more complex interactions, conditional statements, loops, etc.). The configuration tools 124 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 1B:
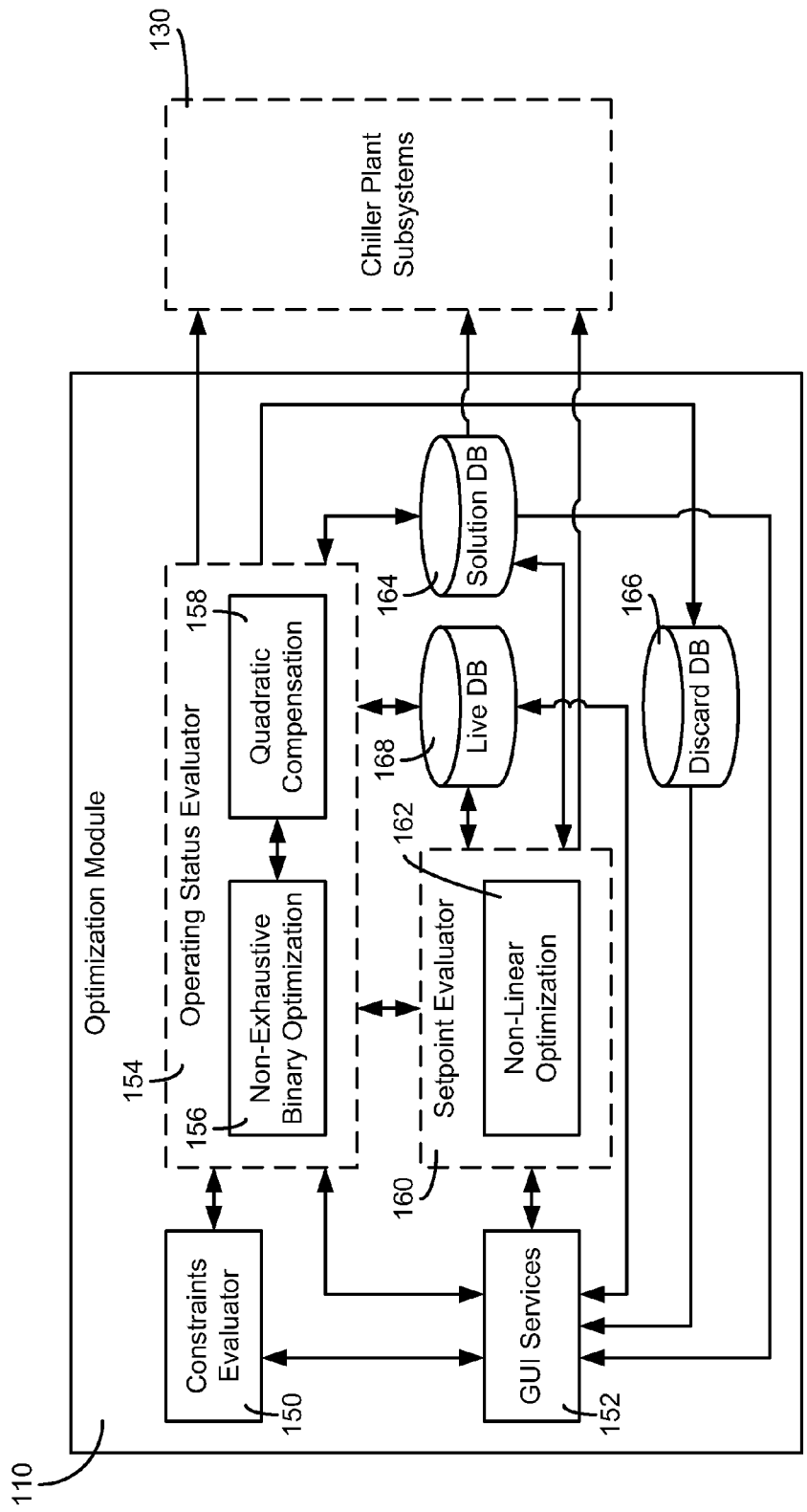
FIG. 1B is a more detailed block diagram of the optimization module of FIG. 1A, according to an exemplary embodiment.

Referring to FIG. 1B, a more detailed block diagram of optimization module 110 of FIG. 1A is shown, according to an exemplary embodiment. Optimization module 110 may store computer code (e.g., be a set of executable computer code instructions stored in non-transitory computer-readable media) that is executable by processor 106. Optimization module 110 may be configured to generate and output operating status commands and setpoints for one or more devices to chiller plant subsystems 130 via, e.g., communications interface 116. The operating status commands (e.g., on/off) and setpoints may be estimated to minimize (i.e., optimize given working parameters) the power consumption of the chiller plant.

Optimization module 110 includes operating status evaluator 154. Operating status evaluator 154 examines a plurality of potential chiller plant device combinations to select a device combination for use by the chiller plant. In an exemplary embodiment, the operating status evaluator uses non-exhaustive binary optimization (e.g., a computer code module for implementing optimization as described herein) and quadratic compensation (e.g., a computer code module for implementing quadratic compensation as described herein) to determine which device combination to select for use.

Figure 4:
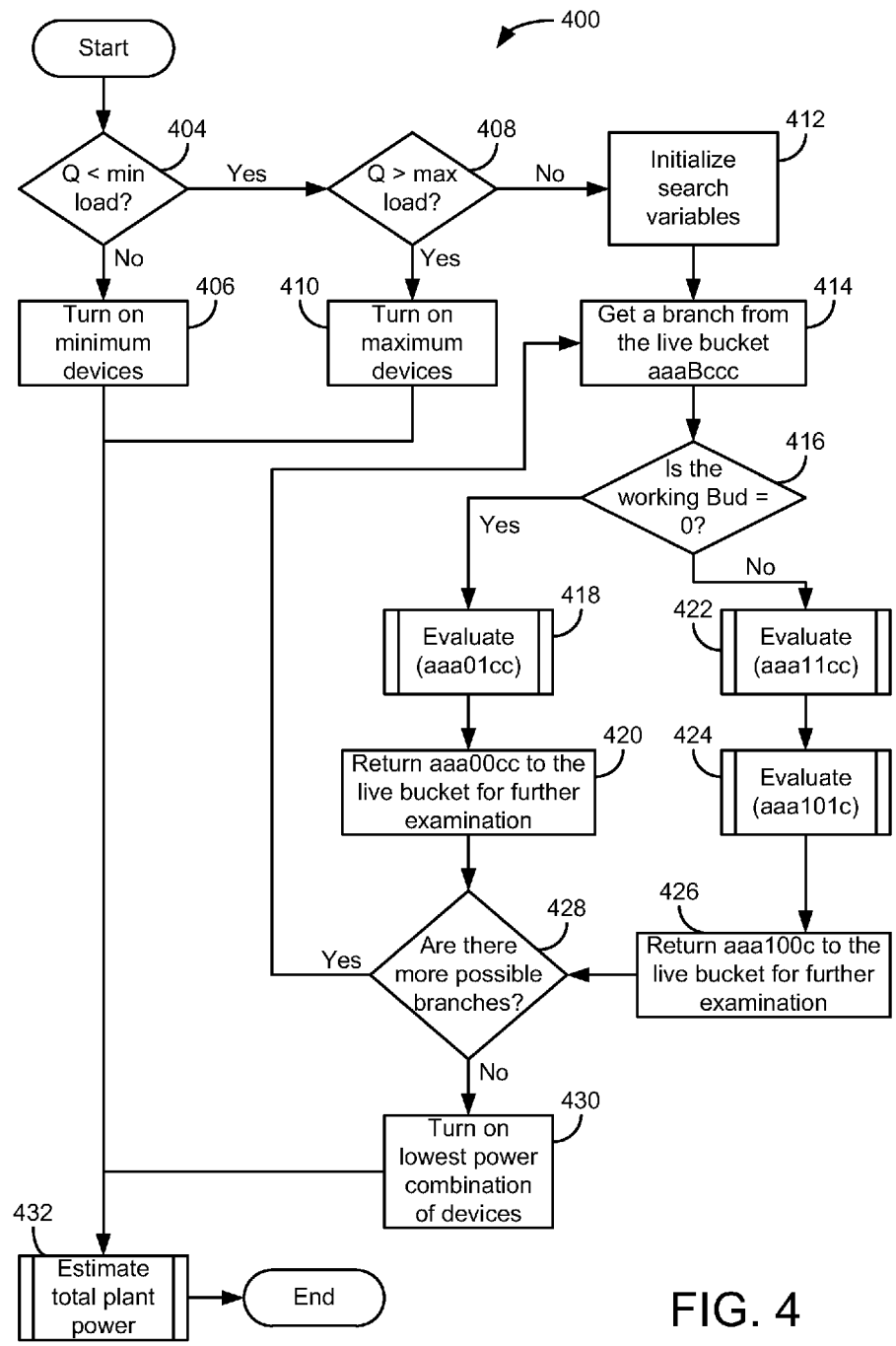
FIG. 4 is a more detailed flow diagram of the process described in FIGS. 3A-3C.
Figure 5:
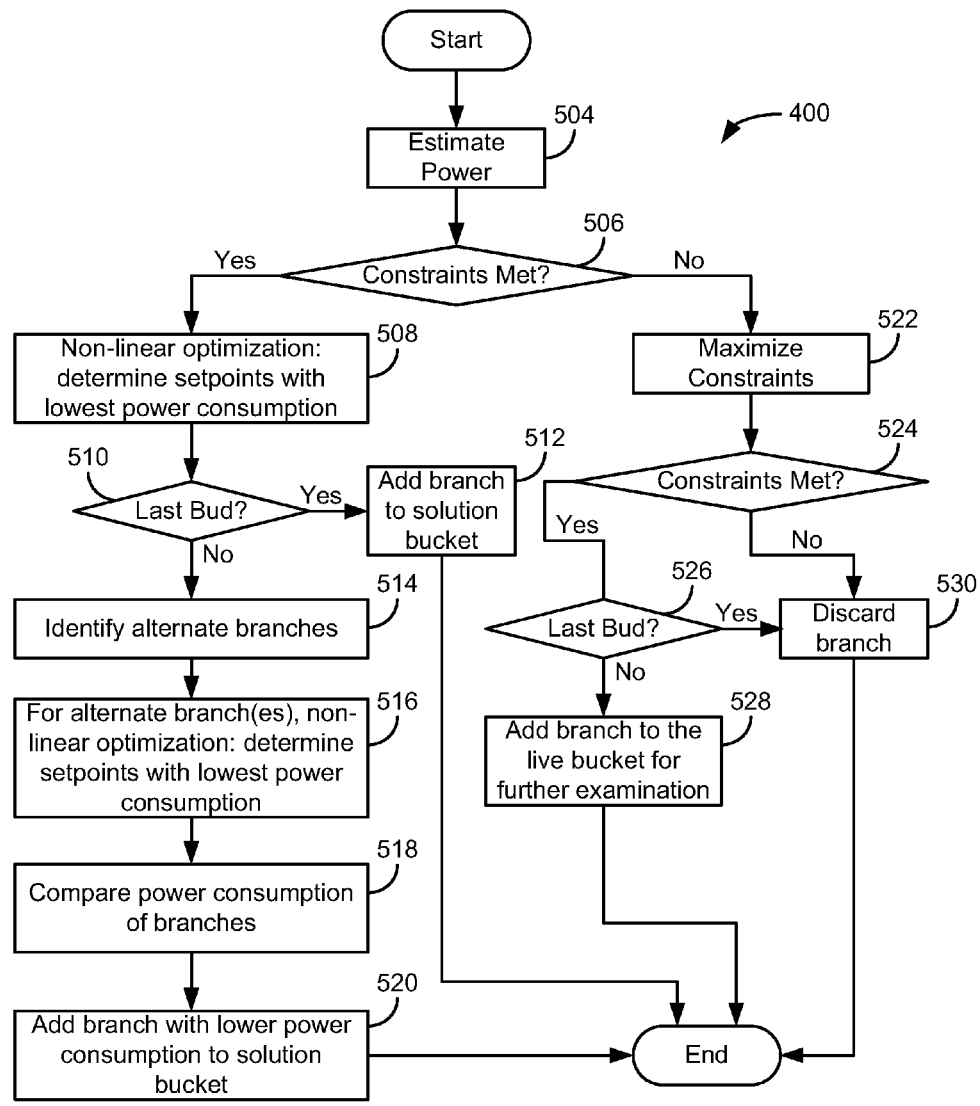
FIG. 5 is a flow diagram of a process for evaluating a particular combination of devices, according to an exemplary embodiment.

Operating status evaluator 154 receives possible combinations of devices from live database 168. Live database 168 may include those combinations that are estimated to be able to satisfy the cooling load and/or constraint requirements. In the discussions of FIGS. 4 and 5, live database 168 is referred to as the "live bucket." Operating status evaluator 154 may transmit combinations to live database 168, solution database 164, and/or discard database 166. Solution database 164 may contain potential combinations which are able to satisfy cooling load and system constraint requirements, and additionally do so with a minimum energy consumption.

Discard database 166 may contain combinations currently known or estimated to be unable to satisfy cooling load and/or system constraint requirements. In some embodiments, operating status evaluator 154 may periodically evaluate new combinations (e.g., those which have not recently been evaluated as a potentially optimal solution) from solution database 164 and/or discard database 166 for further evaluation. Moreover, as new devices are brought online, such new devices and new combinations including the new devices can be added to solution DB 164 for consideration by operating status evaluator 154.

Operating status evaluator 154 may receive constraints on the chilled water system from constraints evaluator 150. Constraints may include, e.g., requiring that each device operate above a certain capacity or load. Operating status evaluator 154 may use the constraints to identify feasible combinations of devices. Operating status evaluator 154 may provide a potential combination of devices to constraint evaluator 150, which may be configured to check the potential combination relative to the current constraints. If a potential combination cannot meet the current constraints, operating status evaluator 154, for example, can move the considered potential combination to the discard DB 166 and/or remove the potential combination from the solution DB 164. Exemplary constraints are described in more detail in the discussion of FIG. 5.

In the embodiment of FIG. 1B, operating status evaluator 154 is shown to include non-exhaustive binary optimization module 156 and quadratic compensation module 158. Binary optimization module 156 may be computer code instructions for optimizing (minimizing) a cost function describing energy consumption of the chiller plant devices. According to an exemplary embodiment, binary optimization is performed using a branch and bound method. The binary optimization process is described in greater detail in the discussion of FIG. 3. According to another exemplary embodiment, the branch and bound method may be executed such that not all of the possible combinations of chiller plant devices are considered in any given situation. This may advantageously reduce computation time required by operating status evaluator 154.

Quadratic compensation module 158 may be computer code instructions configured to compensate for the non-linear nature of the system. In other words, quadratic compensation may account for power consumption of some chiller plant devices having a quadratic form (and not, e.g., a linear form). Quadratic compensation 158 may be selectively utilized when the power consumption of the devices being considered by operating status evaluator 154 is quadratic. The quadratic compensation process is described in greater detail in the discussion of FIG. 3.

Optimization module 110 includes setpoint evaluator 160. Setpoint evaluator 160 may be configured to examine one or more combinations of "on" devices to determine operating setpoints estimated to minimize power consumption while satisfying the cooling load of a building and constraints on the chilled water system. According to exemplary embodiment, setpoint evaluator 160 estimates the optimal chilled water temperature setpoint, condenser water temperature setpoint, and chilled water return temperature setpoint for a given combination of "on" devices of the chiller plant. In other embodiments, more, fewer, or different setpoints may be determined. Setpoint evaluator 160 can receive a combination or combinations of devices for processing from operating status evaluator 154 and/or live database 168 (e.g., the currently active/on devices). Setpoint evaluator 160 may move potential combinations of devices to discard database 166 when the combinations are determined to be infeasible or when a potential combination is repeatedly identified as not being efficient relative to other solutions. In certain situations, setpoint evaluator 160 may also move potential combinations of devices to solution database 164 (e.g., when a combination is estimated to minimize power consumption compared to other combinations).

In the embodiment of FIG. 1B, setpoint evaluator 160 is shown to include a non-linear optimization module 162. Non-linear optimization module 162 may be a computer code module for optimizing (minimizing) a cost function that describes the power consumption of a set of chiller plant devices that are "on." The operating status (e.g., on/off) of the devices may have been previously determined using, e.g., operating status evaluator 154. According to various embodiments, non-linear optimization is performed using direct and/or indirect search methods. For example, Nelder-Mead or downhill simplex method, Generalized Reduced Gradient (GRG), Sequential Quadratic Programming (SQP), Steepest Descent (Cauchy Method), Conjugate Gradient (Fletcher-Reeves Method), etc., may be used. An exemplary non-linear optimization process is described in greater detail in the discussion of FIG. 5.

Optimization module 110 is shown to include live database 168, solution database 164, and discard database 166. Live database 168 may store possible combinations, i.e., those that satisfy plant load requirements and system constraints but may or may not result in the lowest power consumption. Discard database 166 may store infeasible combinations, i.e., those that cannot satisfy plant load requirements and/or system constraints. Solution database 164 may store feasible combinations, i.e., those that satisfy plant load and constraint requirements, and achieve minimum power consumption. Databases 164, 166, and 168 may store the potential combinations in any suitable data structure or data structures, including linked lists, trees, arrays, relational database structures, object-based structures, or other data structures.

Optimization module 110 is further shown to include GUI services 152. GUI services 152 may be configured to generate graphical user interfaces for a chiller plant controller or another server to provide to a user output device (e.g., a display, a mobile phone, a client computer, etc.). The graphical user interfaces may present or explain the active combination of devices, system efficiencies, system setpoints, system constraints, or other system information. GUI services 152 may facilitate a user's (e.g., a chiller plant engineer's) ability to track energy usage and operating statuses of the chiller plant devices via, e.g., a web-based monitoring application. GUI services 152 may additionally allow a user to manually set and update system constraints, available devices, certain thresholds (e.g., for moving a combination to a discard set) optimum off/on operating statuses, and optimum operating setpoints.

Figure 2:
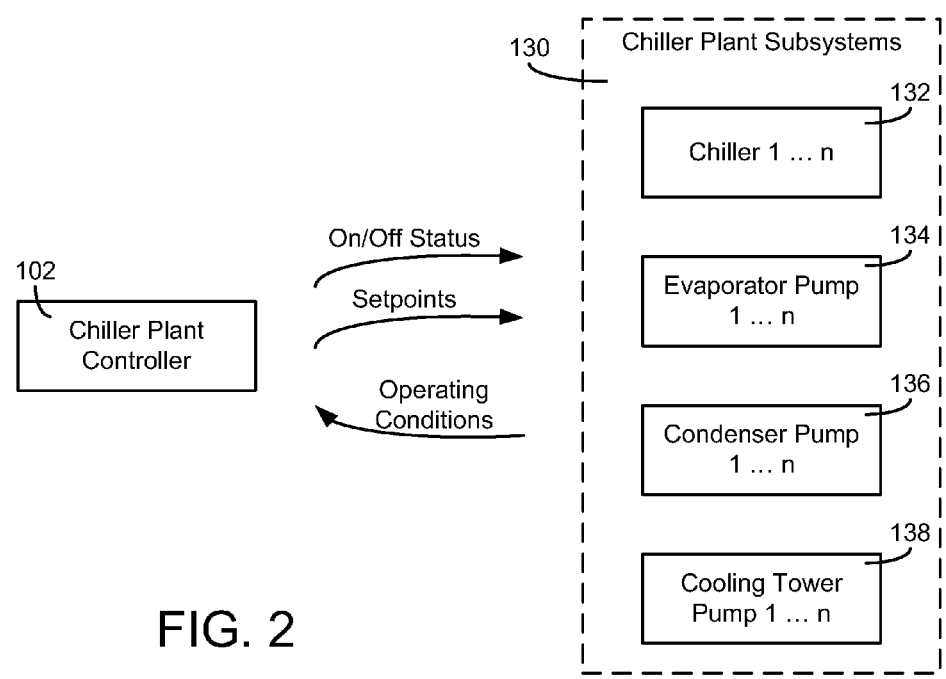
FIG. 2 is a simplified block diagram of a chiller plant controller and chiller plant subsystems, according to an exemplary embodiment.

Referring to FIG. 2, a block diagram of a chiller plant controller and chiller plant subsystems is shown, according to an exemplary embodiment. Chiller plant controller 102 and chiller plant subsystems 130 may transmit and receive data automatically, without a user's intervention. In other embodiments, a user may additionally provide manual inputs or approvals to the chiller plant controller 102 and/or the chiller plant subsystems 130.

As described in FIGS. 1A-1C, 3A-3C, and 4-5, chiller plant controller 102 is configured to transmit determined on/off statuses and operating setpoints to a plurality of chiller plant devices. When the chiller plant devices are operated with the on/off configuration and setpoints (e.g., identified using mixed binary and non-linear optimization as variously described herein), the devices may advantageously provide a reduced (e.g., minimized) power consumption relative to a system operating without the exemplary chiller plant controller 102, while meeting plant load and plant constraints. The devices' performance may be evaluated using a coefficient of performance (COP), a power consumption per plant load (KW/ton) value, or another value indicative of power efficiency or consumption.

Chiller plant subsystems 130 include chillers 132, evaporator pumps 134, condenser pumps 136, and cooling tower pumps 138. The number of devices active within each group and in total may depend on the plant load. Each of the devices may be coupled to a local controller that receives and implements the operating statuses and setpoints from chiller plant controller 102. The local controller may be configured to transmit operating conditions about the chiller plant devices back to chiller plant controller 102. For example, a local controller for a particular device may report or confirm current operating status (on/off), current operating load, device energy consumption, device on/run time, device operating efficiency, failure status, or other information back to chiller plant controller 102 for processing or storage.

Figure 3A:
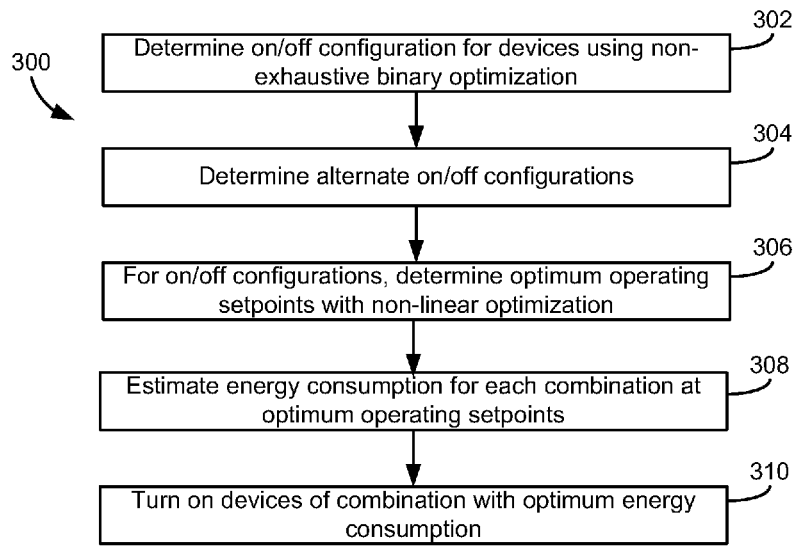
FIGS. 3A-3C are flow diagrams of a process for determining an optimal combination of equipment and optimal operating setpoints for the equipment, according to exemplary embodiments.

Referring to FIG. 3A, a flow diagram of a process 300 for determining an optimal combination of equipment and optimal operating setpoints for the equipment is shown, according to an exemplary embodiment. Process 300 may be implemented on, e.g., chiller plant controller 102 (FIG. 1A). Process 300 may be a high-level representation of a process described in more detail in FIGS. 3B-3C, 4, and 5.

Process 300 includes determining a configuration of devices (e.g., to be turned on rather than off) using non-exhaustive binary optimization (step 302). Step 302 may utilize binary optimization to determine one or more feasible combinations of devices that will satisfy the plant load at a time and for an actual or expected set of conditions (e.g., load conditions, weather conditions, etc.). In some embodiments, feasible combinations will also satisfy constraints on the system (e.g., maximum total power, minimum power per device, etc.).

According to an exemplary embodiment, power devices may turned "on" in order of increasing power consumption. For example, in a set of eight chillers, the first chiller may have the lowest power consumption, and the eighth chiller may have the highest power consumption. Each subsequent chiller, after the first, may have a progressively higher power consumption. In other embodiments, a high capacity but high consumption chiller may be turned on first in order to reduce switching inefficiencies.

The cost function of this optimization problem may be of the form:

$$C = \sum_{i=1}^{k} p_i x_i = p_1 x_1 + p_2 x_2 + \ldots + p_k x_k,$$

where k is the number of devices, $p_i$ describes the power consumption of the ith device, and $x_i$ describes the on/off status of the ith device. $x_i$ is a binary variable, equal to either 0 (device off) or 1 (device on). The cost functions describes the power consumption of a chiller plant. In some embodiments, the devices may be chillers. Chiller power is typically a quadratic function of load and lift, and it is time-variant. As additional chillers are energized, the load per chiller decreases, therefore changing the coefficients of the cost function. According to an exemplary embodiment, the binary optimization may be configured to update with varying cost function coefficients. In some embodiments, the cost function may describe a collection of different kinds of device (e.g., chiller, evaporator pump, condenser pump, cooling tower, etc.). The coefficients in the cost function describing power for each device may be different (e.g., linear, quadratic, time-variant or invariant, etc.). Various components of optimization module 110 (FIG. 1B) may be utilized based on the different devices represented in the cost function. For example, quadratic compensation 158 may be required when chillers are part of the cost function to account for chiller power's quadratic nature.

According to an exemplary embodiment, binary optimization is accomplished using a branch and bound method. The branch and bound method recursively identifies solutions which minimize the cost function (feasible solutions). The solutions (or "branches") are combinations of on/off statuses for the power devices. The method also determines upper and lower bounds for the cost function given the identified solutions. The optimization seeks to minimize the cost function, and branches that do not do so are discarded or pruned. A first solution with a lower bound for the cost function that is greater than the upper bound of second solution's cost function may be eliminated as infeasible. This is because the first solution, at its best (i.e., lowest power consumption), is still higher than the worst or highest power consumption of the second solution. Other solutions are retained and may be compared to one another to determine the optimal solution.

According to an exemplary embodiment, binary optimization is non-exhaustive. That is, non-exhaustive optimization does not search every possible combination of devices to find the optimal solution. This advantageously increase computational efficiency. For example, with eight chillers, there are a possible $2^8$ or 256 combinations. In some embodiments, the non-exhaustive optimization finds the optimal solution in half or fewer searches.

Process 300 includes determining alternate on/off configurations for devices (304). In some embodiments, binary optimization may be used to determine alternate configurations. Step 304 may utilize quadratic compensation to determine which of the identified combinations (solution sets) of devices will satisfy the plant load at a given time and minimize power consumption. Quadratic compensation may advantageously account for the fact that binary optimization (step 302) is intended for a linear system, but the chiller power model is a quadratic function. For example, in a purely linear system, binary optimization will typically return the fewest devices required to meet plant load. If turning two devices on will meet the plant load, then other combinations may not be considered, even if the power consumption of other combinations is lower. In an exemplary embodiment, however, alternative embodiments are identified and then compared using the assistance of quadratic compensation (or another non-linear compensation).

Because chiller power is not linear, quadratic compensation may be conducted on every device having a non-linear or quadratic power curve, advantageously checking for whether the lowest power combination of devices is achieved by adding another device. For example, binary optimization may identify a combination of devices that meets plant load (e.g., two devices on). The binary search may continue by looking ahead to a combination with the next device activated rather than deactivated. For example, even if two devices turned on would meet a plant load, the binary search may use each device's quadratic power curve to consider the expected power change with three devices turned on. The power consumption per device may decrease as additional devices are turned on because one or more of the devices may operate more efficiently at a lower capacity than a higher capacity. The net power consumption may therefore decrease as a result. If three devices on results in lower power, then it is a more optimal solution than two devices on. On the other hand, despite efficiencies gained in the original "on" devices by turning another device on, the overhead energy consumption added by turning on the additional device may result in a determination that the additional device should not be turned on.

Process 300 includes determining optimum operating setpoints with non-linear optimization (306). Step 306 may utilize non-linear optimization to minimize the cost function. According to various embodiments, direct and/or indirect search methods (e.g., downhill simplex (Nelder-Mead) method, GRG, SQP, Cauchy Method, Feltcher-Reeves Method, etc.), are used to perform non-linear optimization. Non-linear optimization determines one or more setpoints that will further minimize power consumption. According to another exemplary embodiment, the cost function is minimized by determining a chilled water temperature setpoint, a condenser water temperature setpoint, and a chilled water return temperature setpoint.

Process 300 includes estimating the energy consumption for combinations of devices with the optimum operating setpoints (308). In some embodiments, more than one combination may be feasible (i.e., each meets plant load and satisfies constraints on the system). More than one feasible combination may arise because one or more combinations are identified via, e.g., non-exhaustive binary optimization. The net energy consumption for each combination is different because the load per device varies as the number of on devices varies.

Process 300 includes turning on the devices of the combination with optimum energy consumption (310). According to an exemplary embodiment, the optimum energy consumption is the lowest energy consumption for devices that will meet the plant load and satisfy constraints on the system.

Figure 3B:
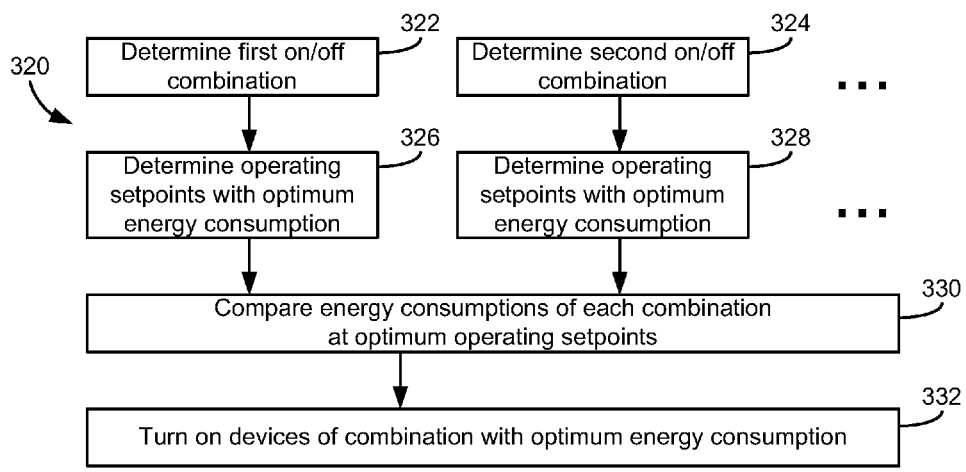

Referring to FIG. 3B, a flow diagram of a process 320 for determining an optimal combination of equipment and optimal operating setpoints for the equipment is shown, according to an exemplary embodiment. Process 320 may be an alternate representation of process 300. Process 320 may be implemented on, e.g., chiller plant controller 102 (FIG. 1A). Process 320 may be a high-level representation of a process described in more detail in FIGS. 3A, 3C, 4, and 5.

Process 320 includes determining a first combination of on/off statuses for power devices in a chiller plant (322). The first combination may be determined using non-exhaustive binary optimization (as described in step 302 of process 300). Process 320 also includes determining a second combination of on/off statuses (324). If the devices of the identified combinations have non-linear or quadratic power curves, quadratic compensation may be used to accurately compare the expected power consumption of the devices (as described in step 304 of process 300). For example, the second combination may be different from the first combination because the second combination includes an additional chiller plant device turned on. Process 320 may include other feasible on/off combinations that are determined via, e.g., binary optimization.

Process 320 includes determining optimum operating setpoints for each of the feasible combinations (326, 328). Setpoints may be determined using non-linear optimization (as described in step 306 of process 300). Process 320 also includes comparing the energy consumptions for each feasible combination (330) and selecting the combination with the optimum energy consumption (332). Steps 330 and 332 may be similar to steps 308 and 310, respectively, of process 300

Figure 3C:
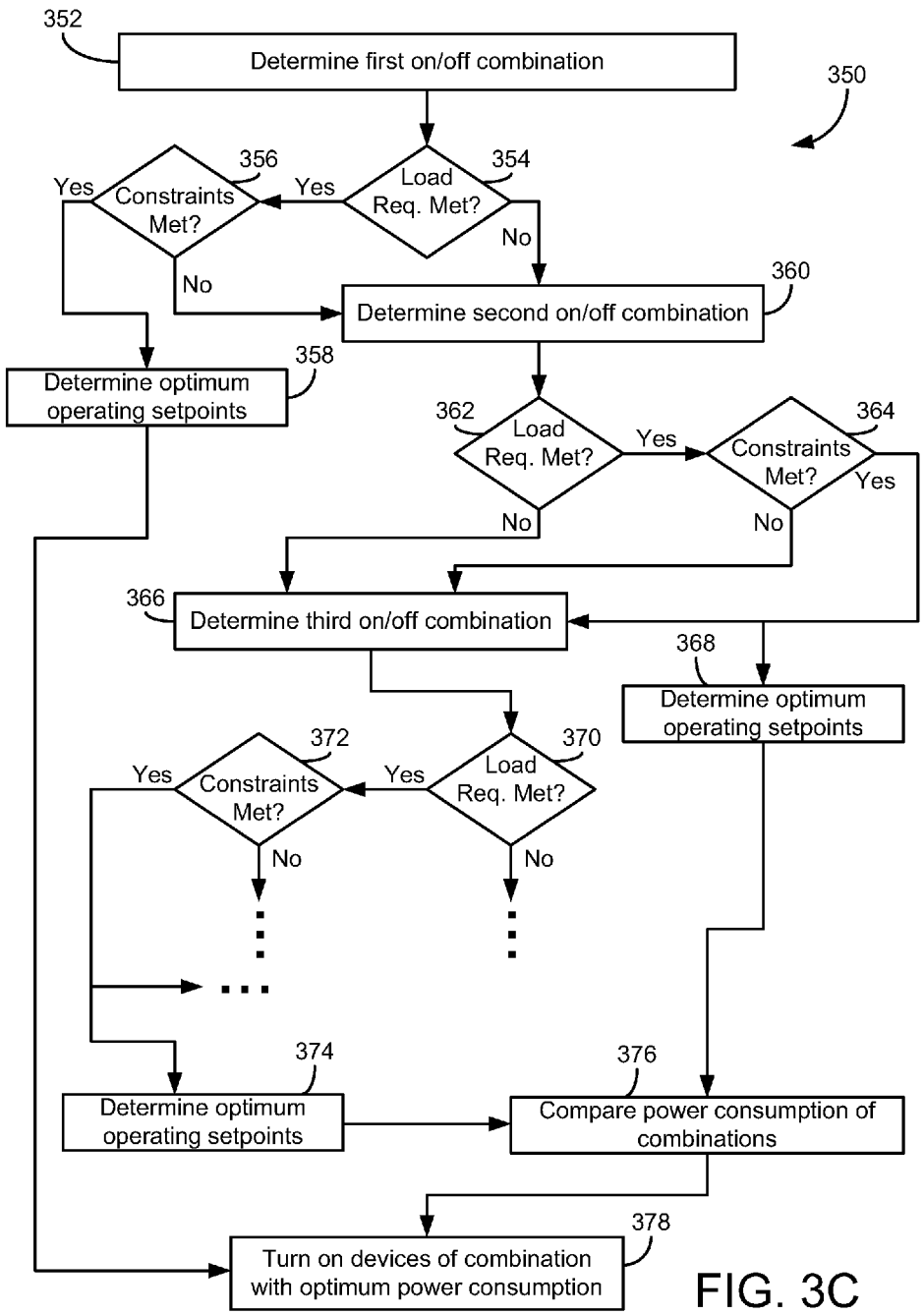

Referring to FIG. 3C, a flow diagram of a process 350 for determining an optimal combination of equipment and optimal operating setpoints for the equipment is shown, according to an exemplary embodiment. Process 350 may be a more detailed representation of process 300 and/or process 320. Process 350 may be implemented on, e.g., chiller plant controller 102 (FIG. 1A). Process 350 may be a higher level representation of a process described in more detail in FIGS. 4 and 5.

Process 350 includes determining a first on/off combination (352). The first on/off combination may be determined using non-exhaustive binary optimization (as described in step 302 of process 300). For example, in a set of eight chillers, determining a first on/off combination may involve finding some subset of chillers that will satisfy the plant load while minimizing the total energy consumption. The chillers may be considered in order of increasing power consumption. The chiller with the lowest power consumption may be considered first. The first combination is thus chiller 1 on and chillers 2-7 off.

Process 350 includes determining whether the first combination will meet the load requirements (354). If chiller 1 alone cannot meet the plant load, then a second on/off combination may be considered (360). If chiller 1 can satisfy the load requirements alone then process 350 includes determining whether the constraints on the system are satisfied (356). The constraints may include prohibiting the system from operating above maximum capacity. The constraints may also include prohibiting any one chiller from operating below a minimum capacity. If the constraints are not satisfied, then a second on/off combination may be determined (360). In some embodiments, if first combination (chiller 1 on and chillers 2-7 off) does satisfy the constraints, then the first combination may be implemented. Process 350 includes determining optimum operating setpoints for the chiller 1 (358), which may further reduce power consumption. The first combination (i.e., chiller 1), with optimum operating setpoints, may be turned on (378).

The first combination in this example may be a special case where determining a second combination (with, e.g., two chillers on) will not result in a lower net power consumption. This is because it is unlikely that having two chillers on, consistent with the system constraints, will ever result in less power consumption that having only one chiller on. In other embodiments, a second on/off combination is determined regardless of the fact the first combination is chiller 1 on and chillers 2-8 off. Quadratic compensation may be utilized to effectively evaluate the expected power consumption of devices with non-linear and/or quadratic power curves.

Process 350 includes determining a second on/off combination (360). The second on/off combination may be determined using, e.g., non-exhaustive binary optimization. The second combination may be determined because, e.g., the first combination could not meet the load requirements and/or satisfy the system constraints. For example, in a set of eight chillers, a second combination may be chillers 1-2 on and chillers 3-8 off. Process 350 includes testing the second combination against the load requirements (362) and the system constraints (364). If one or the other is not satisfied, then a third combination may be determined (366). Even if both the load requirements and system constraints are met, a third combination may be determined (366). If the second combination is a possible solution, then process 350 includes determining optimum operating setpoints (368).

Process 350 includes determining a third on/off combination (366). The third on/off combination may be determined using, e.g., non-exhaustive binary optimization. The third combination may be determined because, e.g., the second combination could not meet the load requirements and/or satisfy the system constraints. Or the third combination may be determined as an alternative, even though second combination is a possible solution. Quadratic compensation may be used to evaluate the expected power consumption of the third combination in comparison to other identified combinations. Process 350 includes testing the third combination against the load requirements (362) and the system constraints (364). If one or the other is not satisfied, then a fourth combination may be determined. Process 350 may be continued until at least one combination that meets plant load and system constraints is identified. If the third combination is a possible solution, then process 350 includes determining optimum operating setpoints (374).

Process 350 includes comparing the power consumptions of the feasible combinations (376). Step 376 may include estimating the power consumption of each combination. According to an exemplary embodiment, the combination with the lowest power consumption may be selected. In the embodiment of FIG. 3C, the combination with the lowest power consumption may be known to meet the plant load and satisfy system constraints. In other embodiments, step 376 may additionally determine whether the combination with the lowest power consumption can meet the plant load and system constraints. Process 350 includes turning on the devices of the combination with the optimum power consumption (378). In some embodiments, the optimum power consumption may be the absolute lowest power consumption. In other embodiments, the optimum power consumption is the lowest power consumption for the combination of devices and setpoints that can meet plant load and satisfy system constraints.

Referring to FIG. 4, a flow diagram of a process 400 for determining an optimal combination of equipment and optimal operating setpoints for the equipment is shown, according to an exemplary embodiment. Process 400 may be a more detailed representation of process 300, process 320, and/or process 350. Process 400 may be implemented on, e.g., chiller plant controller 102 (FIG. 1A).

Process 400 starts with determining the actual plant cooling load Q and comparing it to a minimum load (404). If the actual plant load is less than a minimum load, then a minimum number of chiller plant devices may be turned on (406). According to an exemplary embodiment, when the plant load is less than a minimum, the plant load may be met by a minimum number of chiller plant devices. Turning on a minimum number of devices may advantageously result in a minimum energy consumption. Process 400 includes comparing the actual plant load Q to a maximum (408). If the actual plant load is greater than a maximum load, then a maximum number of chiller plant devices may be turned on (410). According to an exemplary embodiment, when the plant load is greater than a maximum, the plant load may be met only by a maximum number of chiller plant devices. In some embodiments, the minimum and/or maximum load may be computed based on, e.g., historic load values, current building capacity, etc. These computations may be carried out by, e.g., building status monitor 148 (FIG. 1A). In other embodiments, an operator of the chiller plant may set and/or change the minimum and/or maximum load.

When the actual plant load is greater than a minimum and less than a maximum, process 400 includes initializing search variables (412). Search variables may describe the parameters for determining feasible combinations of chiller plant devices. Feasible combinations may be those that meet the plant load and satisfy constraints on the chiller system. Step 412 may include determining the number and type of chiller plant devices, the maximum and minimum operating capacity of the devices, the operating condition and estimated power consumption of each device, etc. This data may be received at chiller plant controller 102 from chiller plant subsystems 130 (FIGS. 1A and 2). According to an exemplary embodiment, combinations of chiller plant devices may be considered in order of increasing power consumption.

Combinations of chiller plant devices may be characterized as "branches," as graphically represented as in FIGS. 6A-6D. A branch corresponds to a particular combination (or some portion thereof) of on/off statuses for one or more devices. Each on/off status may be described as a "bud." For example, in branch 652 of FIG. 6A, the "on" status of chiller 1 and the "on" status of chiller 2 are each individual buds.

Combinations of on/off statuses may additionally be described by strings of the binary variable $x_i$. For example, branch 658 of FIG. 6D may be described as 1101 (i.e., chiller 1 on, chiller 2 on, chiller 3 off, and chiller 4 on). In general, the description of a branch (i.e., a combination of buds) is of the form aaaBccc. "B" represents the bud or device that is presently being considered (i.e., to determine whether the device should be on or off). B may be characterized as the "working bud." "aaa" represents the combination of devices that was previously considered (i.e., devices that are turned on/off before the device corresponding to the working bud). "ccc" represents the combination of devices that will be considered after the working bud device has been determined to be on or off. The general description aaaBccc may represent any number and/or type of devices and is not limited to, e.g., seven devices. According to an exemplary embodiment, the aaa devices have lower power consumption than the working bud device and, thus, the aaa devices are considered before the working bud device. Similarly, the working bud device has lower power consumption than the ccc devices, which are considered after the working bud device.

According to an exemplary embodiment, determining one or more optimal on/off combinations is an iterative process. For example, a portion of a combination of devices may be considered to determine whether that combination has any chance of satisfying the load requirements and/or system constraints. If there is some possibility that the combination could do so, then combination may be returned to a collection of possible combinations. This collection may be, e.g., the live database 168 of FIG. 1B. The collection of potentially feasible combinations may be referred herein to as the live database or live bucket.

Process 400 includes retrieving a branch from the live bucket (414). The branch may be analyzed to determine whether is it represents a potentially feasible combination of devices. The live bucket may contain all or a portion of all combinations of on/off status for the devices of a chiller plant. In some embodiments, the live bucket may contain only combinations that are capable of meeting the load requirements at a given time. In some embodiments, historical or empirical data may be used to determine that some combinations of devices are never feasible. In some embodiments, an operator of the chiller plant may set and/or modify the branches in the live bucket.

Figure 6A:
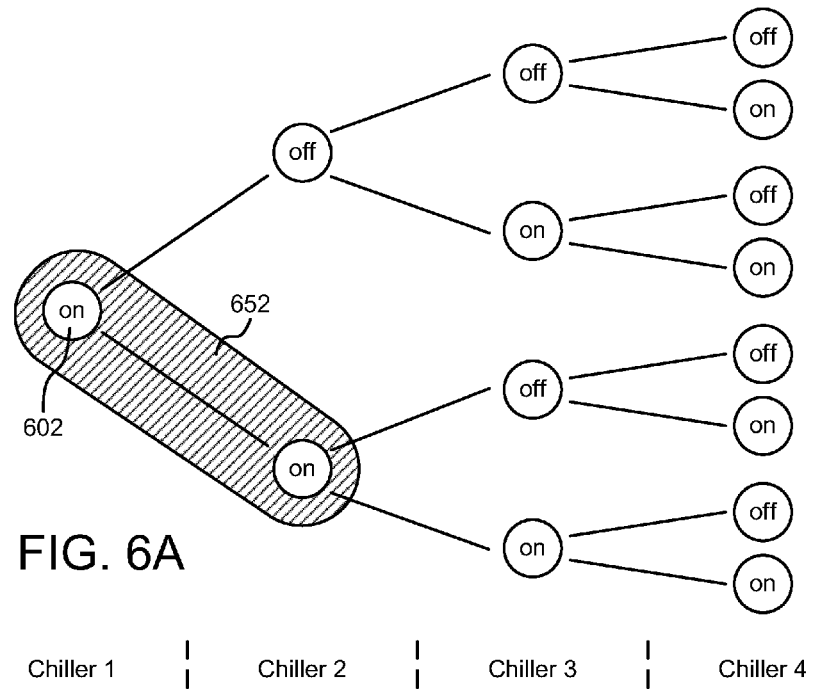
FIGS. 6A-6D are graphical representations of combinations of devices, according to exemplary embodiments.

Process 400 includes determining if the working bud equals zero (i.e., $x_B=0$) (416). Equivalently, step 416 determines whether the presently considered device is on or off. For example, in branch 652 of FIG. 6A, bud 602 may be the working bud. In the embodiment of FIG. 6A, $x_1 \neq 0$ for working bud 602 (i.e., chiller 1 is on). Which and how many subsequent devices are considered may depend on whether the working bud device is on or off. When the working bud is equal to zero, process 400 includes evaluating the combination (aaa01 cc) with the subsequent device on (418). The "0" in this description represents that the device corresponding to the working bud is off, and the "1" indicates that the next device is on. When the working bud is not equal to zero (and equal to one), process 400 includes evaluating a first combination (aaa11 cc) with working bud device on ("1") and the next device on ("1") (422). This combination is represented, for example, in FIG. 6A (with bud 602 as the working bud) and FIG. 6C (with bud 604 as the working bud). Process 400 also includes evaluating a second combination (aaa101c) when the working bud is not equal to zero (424). In the second combination, the working bud device is on ("1"), the next device is off ("0"), and the following device is on ("1"). This is represented, for example, in FIG. 6B (with bud 602 as the working bud) and FIG. 6C (with bud 602 as the working bud).

The device combinations of steps 418 (aaa01 cc), 422 (aaa11 cc), and 424 (aaa101c) may generally describe all potential combinations of devices. The combination of operating statuses for the working bud device and subsequent devices may be shifted (to previous devices or later devices), leading to coverage of all potential combinations. (Not every potential combination may be considered in a non-exhaustive optimization.) The combinations of steps 418, 422, and 424 may be the result of, e.g., binary optimization. Quadratic compensation may be used to account for the non-linear and/or quadratic nature of the power consumption for the identified combinations.

In steps 418, 422, and 424, particular combinations are evaluated to determine whether they meet the load requirements on the chilled water system, and whether the combinations can satisfy restraints on the system. One embodiment of the evaluation process is outlined in FIG. 5 and discussed in more detail below. In summary, FIG. 5 determines whether a particular combination of devices is feasible. If it is not feasible, the combination may be eliminated from further consideration. An eliminated combination may be transmitted to discard database 166 (FIG. 1B). If it is feasible, the combination may be considered further. For example, the combination may be returned to live database 168. If it is feasible and results in the optimum power consumption when compared to alternatives, the combination may be a solution to the optimization problem and the on/off statuses may be implemented the devices of the chilled water system. In this case, the combination may be transmitted to solution database 164.

Process 400 includes returning the combinations not evaluated to the live bucket for further examination (420, 426). When the working bud device is off ($x_B=0$), the combination considered is with the next device on (step 418, as described above). The combination that is not considered is with the next device off (i.e., aaa00 cc). Step 420 returns the unevaluated combination to the live bucket so that it remains a potential solution to the optimization problem. Similarly, when the working bud device is on ($x_B=1$), the combination that is not considered is with the both the next device and the following device off (i.e., aaa100c). Step 426 returns the unevaluated combination to the live bucket.

Process 400 includes determining if there are additional branches to be evaluated (428). Additional combinations of devices are potential solutions to the optimization problem. Additional combinations may exist so long as the working bud considered in steps 418, 422, and/or 424 was not the last bud (i.e., the last device). However, branches may have been discarded because they were determined to be unable to satisfy systems constraints under any circumstances. When other possible branches exist, process 400 includes retrieving the branch from the live bucket (414).

Process 400 includes turning on the devices resulting in an optimum power combination, when there are no other possible branches (430). The optimum power combination of devices may be determined based on combinations evaluated in steps 418, 422, and/or 424. The optimum power combination may have the comparatively lowest, minimum, or near-minimum power consumption. The lowest power combination of devices may be the combination which also satisfies system load or constraint requirements because combinations that do not do so may have been removed from consideration.

Process 400 includes estimating the total plant power when a combination of devices is turned on (432). The combination may be a minimum (406), a maximum (410), or an optimum (430) number of devices. The total chiller plant power and/or individual device power may be received from chiller plant subsystems 130 at chiller plant controller 102 (FIG. 1A). The total plant power may be stored in a memory, such as memory device 108 (FIG. 1A).

Referring to FIG. 5, a flow diagram of a process 500 for evaluating a particular combination of devices is shown, according to an exemplary embodiment. Process 500 may be a more detailed description of steps 418, 422, and 424 (FIG. 4). Process 500 may be implemented on, e.g., chiller plant controller 102 (FIG. 1A). According to an exemplary embodiment, process 500 determines whether a particular combination of devices satisfies constraints on chiller plant system, determines optimum operating setpoints for the devices of the combination, and determines whether power consumption of the combination is less than other combinations.

Process 500 begins by estimating the power consumption of combination to be evaluated (504). The estimation may be based on the number of devices that are "on" in the combination, the current cooling load, etc. The power consumption of the combination may be improved when optimum operating setpoints are determined. Process 500 includes determining whether the combination satisfies constraints on the system (506). The constraints may establish minimum and/or maximum parameters for devices of the chilled water system. In some embodiments, the constraints are automatically generated quantities based on, e.g., historical data. In other embodiments, an operator of the chilled water system may set and/or modify the constraints. The constraints include, for example, that each device of the chilled water system operate with a minimum load (such as 30%). This requirement may advantageously ensure that power is being consumed efficiently (i.e., the work done by the device is sufficient to justify the power required to operate the device). The constraints may also include that the total power of the chiller plant be less than a maximum. This requirement may advantageously prevent the chiller plant from becoming overloaded.

If a first combination of devices does not satisfy the constraints, process 500 includes steps 522 and 524 to determine if the constraints can ever be met by any combination of devices that includes first combination. This may be, for example, with additional devices added to the first combination. Step 522 maximizes the constraints. If a constraint in step 506 is specific to the particular combination, then step 522 may generalize the constraint to the devices of the particular combination plus additional devices. For example, a first combination of devices may result in total power consumption over a maximum (in violation of a constraint). Step 522 may determine if any second combination (the first combination plus additional devices) would bring the total power consumption below the maximum or meet some other constraint. According to an exemplary embodiment, step 522 may add buds to a particular branch to determine if the branch will ever satisfy the constraints. If there is no combination of devices for a given branch that will satisfy the constraints, process 500 includes discarding the branch (530) to, e.g., discard database 166 (FIG. 1B). If the branch (with any collection of buds) will satisfy the constraints, the branch may be retained. Process 500 includes determining if the maximized constraints will be met only at the last bud (526). If so, the branch may be discarded (530). This may advantageously eliminate branches that require all devices of a chiller plant to be on. If the maximized constraints are met before the last bud (so that all devices are not on), the branch may be retained for further examination (528).

If the first combination of devices does satisfy the constraints, process 500 includes using non-linear optimization to determine the setpoints of the devices in the combination that minimize power consumption (508). Any of a number of non-linear optimization methods may be used. According to an exemplary embodiment, direct and/or indirect search methods may be used. For example, a Nelder-Mead or downhill simplex method may be used. This method involves iteratively moving a simplex (an n-dimensional geometric object of n+1 vertices, where n is the number of independent variables in the cost function) towards a minimum, along the topography of the n-dimensional cost function, using a variety of mathematical transformations (e.g., reflection, reflection with expansion or contraction, contraction, etc.). An end position of the simplex's vertices may describe values for the independent variables that minimize the cost function. In other embodiments, Generalized Reduced Gradient (GRG), Sequential Quadratic Programming (SQP), Steepest Descent (Cauchy Method), Conjugate Gradient (Fletcher-Reeves Method), etc., may be used. The Cauchy Method and the Fletcher-Reaves Method may be advantageously utilized on a well behaved gradient (i.e., cost function) and/or, because they converge quickly, when less processor bandwidth is available. GRG and SQP may be advantageously utilized with more complex gradients and/or when more processor bandwidth is available.

According to an exemplary embodiment, the optimization procedure determines three setpoints for the set of chiller devices. These setpoints include the chilled water temperature setpoint, condenser water temperature setpoint, an chilled water return temperature setpoint. In other embodiments, fewer, more, or different setpoints may be determined. From these setpoints, other operating conditions for the devices of the chiller plant may be determined, including, e.g., flow on evaporator water loop, flow on the condenser water loop, etc. In other embodiments, setpoints for each of the individual devices may be determined. For example, the optimal valve position, damper position, vane position, fan speed, pump speed, etc., may be determined.

Process 500 includes determining if the non-linear optimization was performed on the last bud of a branch (i.e., all devices of the combination are on) (510). If so, then process 500 includes adding the branch to the solution bucket (512). The combination added to the solution bucket represents a set of on/off statuses and operating setpoints for the on devices that optimizes the power consumption of the chiller plant. Because it is the last bud, there are no additional devices to add to the combination. If the non-linear optimization was not performed on the last bud, process 500 includes identifying alternate branches (514). As described above, alternate branches may be identified by considering whether a combination with one or more additional devices turned on will also meet the total plant load and system constraints, and do so with a lower power consumption. When the identified combinations include devices with non-linear and/or quadratic power curves, quadratic compensation may be used to evaluate the power consumption of the combinations. Process 500 includes using non-linear optimization to determine optimal setpoints for the alternate branches (516). Non-linear optimization may be performed on the alternate branches as described above. The optimized power consumption of the first branch and the alternate branches may be compared (518). Each combination may reflect the estimated minimum power consumption for each combination. Process 500 includes adding the branch with the lower or lowest power consumption to the solution bucket (520). The combination with the lower power consumption of the optimized combinations may be implemented in the chiller plant to minimize power consumption while meeting plant load and chiller plant constraints.

Referring to FIGS. 6A-6D, graphical representations of combinations of the devices are shown, according to exemplary embodiments. The combinations are depicted in a tree structures, with branches representing combinations of devices and buds representing the on/off status of individual devices. FIGS. 6A-6D represent four chillers. According to an exemplary embodiment, chiller 1 results in the least power consumption. The remaining chillers result in incrementally greater power consumption, with chiller 4 resulting in the comparatively largest power consumption. FIGS. 6A-6D are shown to include branches starting with the chiller 1 on. The tree structures (i.e., database, array, data object, etc.) may be created, maintained, updated, processed, and/or stored in live database 168, solution database 164, and/or discard database 166. The computations reflected in the tree structures (e.g., on/off statuses) of FIGS. 6A-6D may be completed by chiller plant controller 102 (FIG. 1A).

The tree structures of FIGS. 6A-6D may be output to at least one of a memory device, a user device, or another device on the building management system. The output may be a graphical user interface (e.g., on a client device, on a mobile device, generated by a web server, etc.). For example, the tree structure of FIG. 6A may be output to monitoring and reporting applications 126 via GUI engine 122 (FIG. 1A). Depending on the embodiment, the tree structure may include a portion or all of the branches and buds of data shown in FIGS. 6A-6D. In some embodiments, a user may be able, via a user interface, to choose which branches and buds should be visible. A user may also be able to add branches and buds of data not shown in FIGS. 6A-6D, including, e.g., branches with chiller 1 off. In other embodiments, the processes described herein will operate without displaying a graphical representation of a combination. While the tree structures of FIGS. 6A-6D are shown as two-dimensional figures, another information structure suitable for representing and storing the data of the chart may be used. For example, a relational database having one or more related tables may be used.

Referring to FIG. 6A, a graphical representation of a combination of devices is shown, according to an exemplary embodiment. Bud 602 may represent the working bud of the live branch (i.e., the device being considered in a possible or feasible combination of devices). Combination 652 includes chiller 1 on and chiller 2 on. Combination 652 may represent the branch aaa11 cc of step 422 (FIG. 4). The on/off status of additional devices (e.g., chiller 3 and chiller 4) may be added to combination 652 as part of determining alternate combinations of devices that will also satisfy plant load.

Figure 6B:
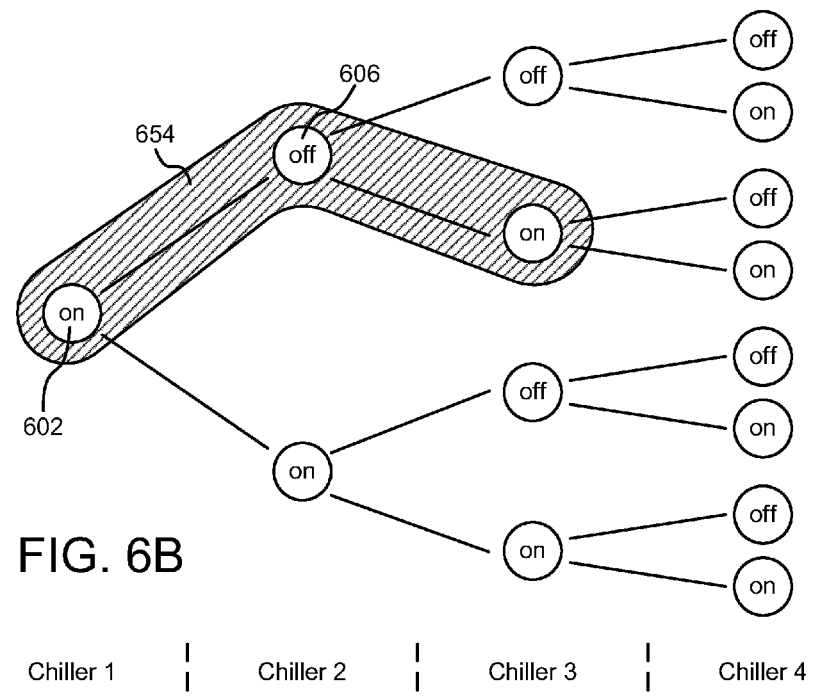
Figure 6C:
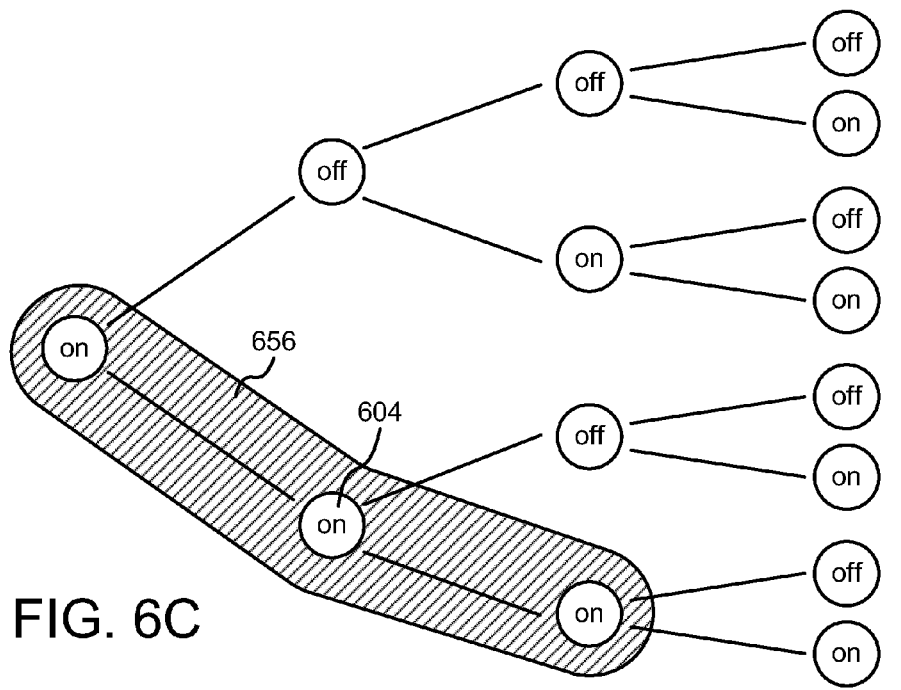

Referring to FIG. 6B, a graphical representation of another combination of devices is shown, according to an exemplary embodiment. Bud 602 may be the working bud. Combination 654 includes chiller 1 on, chiller 2 off, and chiller 3 on. Combination 654 may represent branch aaa101c of step 424 (FIG. 4). The on/off status of additional devices (e.g., chiller 4) may be added to combination 654 as part of determining alternate combinations of devices that will satisfy plant load. In another embodiment, bud 606 may be the working bud. Combination 654 may then represent branch aaa01 cc of step 418 (with the working bud device off and the next device on). According to an exemplary embodiment, combination 654 may be an alternative to combination 652 that is identified in step 514 (FIG. 5).

Referring to FIG. 6B, a graphical representation of another combination of devices is shown, according to an exemplary embodiment. Bud 604 may represent the working bud of the live branch. Combination 656 includes chiller 1 on, chiller 2 on, and chiller 3 on. Combination 656 may represent the branch aaa11 cc of step 422 (FIG. 4) (with the working bud device on and the next device on). The "on" status of chiller 1 is representative of previous devices in the branch described in the "aaa" portion of "aaa11 cc." The on/off status of additional devices (e.g., chiller 4) may be added to combination 656 as part of determining alternate combinations of devices that will also satisfy plant load.

Figure 6D:
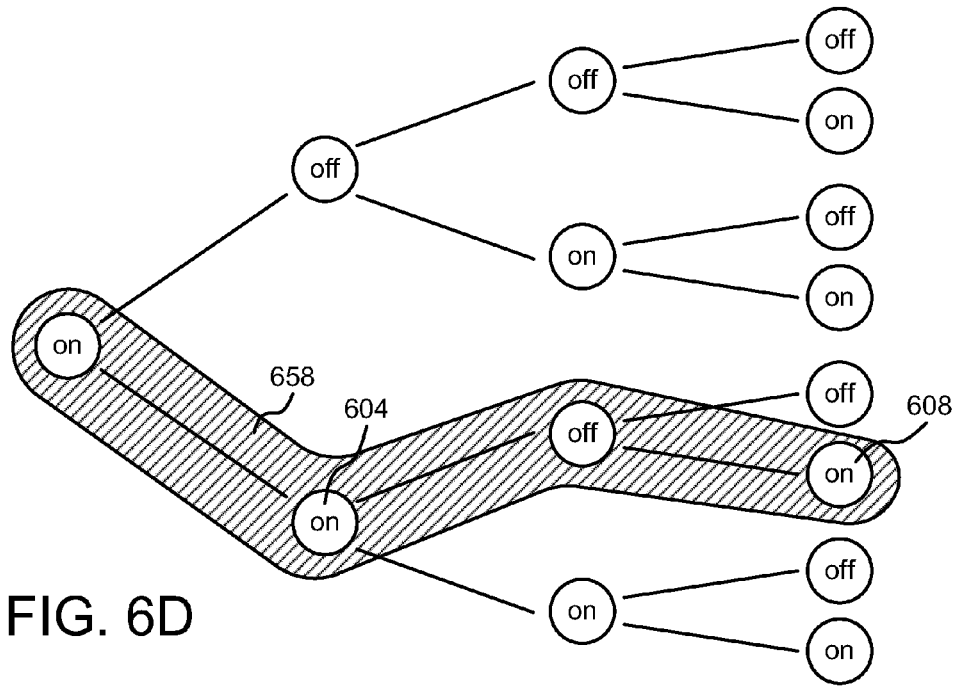

Referring to FIG. 6D, a graphical representation of yet another combination of devices is shown, according to an exemplary embodiment. Bud 604 may be the working bud. Combination 658 includes chiller 1 on, chiller 2 on, chiller 3 off, and chiller 4 on. Combination 658 may represent branch aaa101c of step 424 (FIG. 4) (with the working bud device on, the next device off, and the following device on). The "on" status of chiller 1 is representative of previous devices in the branch described in the "aaa" portion of "aaa11 cc." In an embodiment with a chiller plant of four devices, bud 608 may represent the last bud. According to an exemplary embodiment, combination 658 may be an alternate combination that is identified in step 514 (FIG. 5), when, e.g., combination 656 is being evaluated.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method for controlling a chiller plant for cooling a building, the chiller plant having a chiller plant load, the method comprising:
   estimating an optimal combination of chiller plant equipment for meeting the chiller plant load, wherein estimating the optimal combination of chiller plant equipment comprises using binary optimization to determine at least two potential combinations of chiller plant equipment and using nonlinear optimization to determine a potential power consumption minimum for each of the at least two potential combinations; and
   controlling the chiller plant according to the estimated optimal combination of chiller plant equipment.

2. The method of claim 1, wherein using binary optimization comprises:
   identifying a first combination of devices to be turned; and
   identifying at least a second combination of devices to be turned on,
   wherein each combination minimizes a function of a power consumption of the chiller plant and provides a cooling energy to satisfy the chiller plant load.

3. The method of claim 2, wherein a branch and bound method is used to identify the first combination of devices.

4. The method of claim 2, wherein identifying at least a second combination of devices comprises:
   determining whether a first device of the first combination is on or off;
   determining, if the first device is off, whether a second combination of a second device on and the first device off can provide the cooling energy to satisfy the chiller plant load;
   identifying the second combination, if the first device is off and if the second combination can provide the cooling energy to satisfy the chiller plant load;
   determining, if the first device is on, whether a third combination of the second device on and the first device on can provide the cooling energy to satisfy the chiller plant load;
   determining, if the first device is on, whether a fourth combination of a third device on, the second device off, and the first device on can provide the cooling energy to satisfy the chiller plant load;
   identifying the third combination, the fourth combination or both, if the first device is on and the third combination, the fourth combination, or both can provide the cooling energy to satisfy the chiller plant load.

5. The method of claim 4, wherein identifying at least a second combination of devices further comprises estimating the non-linear power consumption of at least one of the first combination, the second combination, the third combination, and the fourth combination using quadratic compensation.

6. The method of claim 1, wherein using nonlinear optimization comprises minimizing a function of a power consumption of the chiller plant using at least one of a Nelder-Mead method, a Generalized Reduced Gradient method, Sequential Quadratic Programming, a Steepest Descent method, and a Conjugate Gradient method.

7. A computerized method for controlling a chiller plant for cooling a building, the method comprising:
   identifying, at a processing circuit, a first combination of on/off statuses for a plurality of cooling devices using non-exhaustive binary optimization;
   identifying at least a second combination of on/off statuses for the plurality of cooling devices;
   identifying, for each of the first combination and at least a second combination, optimized operating setpoints for the plurality of cooling devices using a non-linear optimization;
   using the optimized operating setpoints identified with the non-linear optimization, estimating a likely energy consumption for the first combination of on/off statuses and at least a second combination of on/off statuses;
   comparing the estimated likely energy consumption for the first combination of on/off statuses and at least a second combination of on/off statuses to determine which combination of cooling devices to turn on; and
   controlling the chiller plant according to the determined combination of cooling devices to turn on.

8. The method of claim 7, wherein controlling the chiller plant according to the determined combination of cooling devices comprises:
   transmitting commands to the chiller plant using the on/off statuses of the determined combination of cooling devices to turn on.

9. The method of claim 8, wherein controlling the chiller plant according to the determined combination of cooling devices further comprises:
transmitting the identified optimized operating setpoints to the chiller plant for the determined combination of cooling devices to turn on.

10. The method of claim 7, wherein the plurality of cooling devices comprises at least one chiller, at least one evaporator pump, at least one condenser pump, and at least one cooling tower.

11. The method of claim 7, wherein the first combination and at least a second combination are estimated to provide a cooling energy required to satisfy a chiller plant load.

12. The method of claim 7, wherein identifying at least a second combination of on/off statuses for the plurality of cooling devices comprises:
determining whether a first device of the first combination is on or off;
determining, if the first device is off, a second combination of a second device on and the first device off;
determining, if the first device is on, a third combination of the second device on and the first device on;
determining, if the first device is on, a fourth combination of a third device on, the second device off, and the first device on;
identifying at least one of the second combination, the third combination, and the fourth combination when the second combination, the third combination, or the fourth combination is estimated to provide the cooling energy required to satisfy the chiller plant load.

13. The method of claim 12, wherein identifying at least a second combination of devices further comprises estimating the non-linear power consumption of at least one of the first combination, the second combination, the third combination, and the fourth combination using quadratic compensation.

14. The method of claim 12, wherein the first device consumes a least amount of energy and subsequent devices consume progressively greater amounts of energy.

15. The method of claim 7, wherein the operating setpoints comprise at least one of a chilled water temperature setpoint, a condenser water temperature setpoint, and a chilled water return temperature setpoint.

16. The method of claim 7, wherein binary optimization comprises a branch and bound method.

17. The method of claim 7, wherein non-linear optimization comprises at least one of a Nelder-Mead method, a Generalized Reduced Gradient method, Sequential Quadratic Programming, a Steepest Descent method, and a Conjugate Gradient method.

18. The method of claim 7, wherein the optimum operating setpoints minimize energy consumption of the chiller plant.

19. The method of claim 7, wherein the first combination and at least a second combination satisfy constraints on the chiller plant.

20. The method of claim 19, wherein the constraints comprise at least one of (a) operating the chiller plant with an energy consumption below a maximum energy consumption and (b) operating any one device with an energy consumption above a minimum energy consumption.

21. The method of claim 7, further comprising outputting an indication of the on/off statuses and optimum operating setpoints to at least one of a memory device, a user device, or another device on a building management system.

22. A controller for controlling a chiller plant for cooling a building, the chiller plant having a chiller plant load, the controller comprising:
a processing circuit configured to estimate an optimal combination of chiller plant equipment for meeting the chiller plant load, wherein estimating the optimal combination of chiller plant equipment comprises using binary optimization to determine at least two potential combinations of chiller plant equipment and using non-linear optimization to determine a potential power consumption minimum for each of the at least two potential combinations; and
wherein the processing circuit is further configured to control the chiller plant according to the estimated optimal combination of chiller plant equipment.

23. The controller of claim 22, wherein using binary optimization comprises:
identifying a first combination of equipment to be turned; and
identifying at least a second combination of equipment to be turned on,
wherein each combination minimizes a function of a power consumption of the chiller plant and provides a cooling energy to satisfy the chiller plant load.

24. The controller of claim 23, wherein a branch and bound method is used to identify the first combination of equipment.

25. The controller of claim 23, wherein identifying at least a second combination of equipment comprises:
determining whether a first device of the first combination is on or off;
determining, if the first device is off, whether a second combination of a second device on and the first device off can provide the cooling energy to satisfy the chiller plant load;
identifying the second combination, if the first device is off and if the second combination can provide the cooling energy to satisfy the chiller plant load;
determining, if the first device is on, whether a third combination of the second device on and the first device on can provide the cooling energy to satisfy the chiller plant load;
determining, if the first device is on, whether a fourth combination of a third device on, the second device off, and the first device on can provide the cooling energy to satisfy the chiller plant load;
identifying the third combination, the fourth combination or both, if the first device is on and the third combination, the fourth combination, or both can provide the cooling energy to satisfy the chiller plant load.

26. The controller of claim 25, wherein identifying at least a second combination of devices further comprises estimating the non-linear power consumption of at least one of the first combination, the second combination, the third combination, and the fourth combination using quadratic compensation.

27. The controller of claim 22, wherein using nonlinear optimization comprises minimizing a function of a power consumption of the chiller plant using at least one of a Nelder-Mead method, a Generalized Reduced Gradient method, Sequential Quadratic Programming, a Steepest Descent method, and a Conjugate Gradient method.

* * * * *